United States Patent
Levin et al.

(10) Patent No.: US 11,868,441 B2
(45) Date of Patent: Jan. 9, 2024

(54) DUPLICATE FRAMES DETECTION

(71) Applicant: NBCUniversal Media, LLC, New York, NY (US)

(72) Inventors: Michael S. Levin, Jersey City, NJ (US); Christopher Lynn, Brooklyn, NY (US); Alexandra Paige, New York, NY (US); Constantinos Hoppas, Mt. Kisco, NY (US); Matthew Nash, Yorba Linda, CA (US); Rachel A. Price, New York, NY (US)

(73) Assignee: NBCUniversal Media, LLC, New York, NY (US)

( * ) Notice: Subject to any disclaimer, the term of this patent is extended or adjusted under 35 U.S.C. 154(b) by 165 days.

(21) Appl. No.: 17/390,321

(22) Filed: Jul. 30, 2021

(65) Prior Publication Data

US 2022/0092341 A1 Mar. 24, 2022

Related U.S. Application Data

(60) Provisional application No. 63/081,684, filed on Sep. 22, 2020.

(51) Int. Cl.
*G06K 9/00* (2022.01)
*G06F 18/22* (2023.01)
*G06V 20/40* (2022.01)
*G06V 20/00* (2022.01)

(52) U.S. Cl.
CPC ............. *G06F 18/22* (2023.01); *G06V 20/41* (2022.01); *G06V 20/46* (2022.01); *G06V 20/95* (2022.01)

(58) Field of Classification Search
None
See application file for complete search history.

(56) References Cited

U.S. PATENT DOCUMENTS

| 2022/0139085 A1* | 5/2022 | Lv | G06V 20/48 |
| | | | 382/156 |
| 2022/0292809 A1* | 9/2022 | Choudhary | G06F 18/2135 |

OTHER PUBLICATIONS

Hu et al., "An improved fingerprinting algorithm for detection of video frame duplication forgery" (Year: 2013).*
Leblanc, M., Detecting duplicate images using python, https://blog.iconfinder.com/detecting-duplicate-images-using-python, Sep. 16, 2017.
Duplicates frames. cause and means? www.videohelp.com. (n.d.). https://forum.videohelp.com/threads/394366-Duplicates-Frames-Cause-and-means.

(Continued)

*Primary Examiner* — Soo Jin Park
(74) *Attorney, Agent, or Firm* — Fletcher Yoder, P.C.

(57) ABSTRACT

Systems and methods for detecting duplicate frames is provided. An automated duplicate frames detection service may extract one or more frames from content and determine a hamming distance between each of the extracted one or more frames and adjacent frames. In response to determining the hamming distance is less than a threshold hamming distance, the duplicate frames detection service may determine duplicate frames. In turn, the duplicate frames detection service may determine the duplicate frames are created without intent in response to determining the average distance between the one or more duplicate frames meets threshold criteria and provide an indication of the one or more duplicate frames without intent to a client device.

19 Claims, 8 Drawing Sheets

(56) References Cited

OTHER PUBLICATIONS

S. Andy, Simple duplicate frame detection of MJPEG codec for video forensic, 2017 2nd International conferences on Information Technology, Information Systems and Electrical Engineering (ICITISEE), 2017, pp. 321-324, doi: 10.1109/ICITISEE.2017.8285520.

Li, Fast distributed video deduplication via locality-sensitive hashing with similarity ranking, EURASIP Journal on Image and Video Processing, 2019, https://doi.org/10.1186/s13640-019-0442-7.

Yang, Multiscale video sequence matching for near-duplicate detection and retrieval, Springer Science+Business Media, LLC, part of Springer Nature 2018.

How can I find duplicate videos from a large set of videos of varying formats?—Video Production Stack Exchange, https://video.stackexchange.com/questions/5307/how-can-i-find-duplicate-videos-from-a-large-set-of-videos-of-varying-formats.

Algorithm to identify similar frames in a video, https://stats.stackexchange.com/questions/245462/algorithm-to-identify-similar-frames-in-a-video Apr. 2021.

\* cited by examiner

NUMBER OF FRAMES: 4
RESOLUTION: 1920 X 1080
DURATION: 1 SECOND

CURRENT FRAME 1 [DUPLICATE]  ⎫ 302
CURRENT HASH: ..... 000001   ⎬
PREVIOUS HASH: ..... 100001  ⎭

CURRENT FRAME 2              ⎫
CURRENT HASH: ..... 011110   ⎬
PREVIOUS HASH: ..... 100001  ⎭ 304

CURRENT FRAME 3
CURRENT HASH: ..... 100001
PREVIOUS HASH: ..... 011110

CURRENT FRAME 4 [DUPLICATE]
CURRENT HASH: ..... 010001
PREVIOUS HASH: ..... 100001

TOTAL DUPLICATES DETECTED: 2 — 306
DUPLICATES ARRAY: [01001] — 308

*FIG. 7*

```
                                    ← 350
    NUMBER OF FRAMES: 17
    RESOLUTION: 1920 X 1080
    DURATION: 1 SECOND
    ─────────────────────────────
    CURRENT FRAME 1   [DUPLICATE]
    CURRENT HASH:  ..... 000000
    PREVIOUS HASH: ..... 000001

CURRENT FRAME 5   [DUPLICATE]
    CURRENT HASH:  ..... 100001
    PREVIOUS HASH: ..... 000000

CURRENT FRAME 9   [DUPLICATE]
    CURRENT HASH:  ..... 010110
    PREVIOUS HASH: ..... 100001

CURRENT FRAME 13  [DUPLICATE]
    CURRENT HASH:  ..... 011001
    PREVIOUS HASH: ..... 010110

CURRENT FRAME 17  [DUPLICATE]
    CURRENT HASH:  ..... 011000
    PREVIOUS HASH: ..... 011001
    ─────────────────────────── 352
    TOTAL DUPLICATES DETECTED: 5 ── 354
    DUPLICATES ARRAY: [01000100010001]
    AVERAGE DUPLICATION FRAME RATE: 4
    DUPLICATE FRAME ISSUE DETECTED ─ 356
                                    358
```

*FIG. 8*

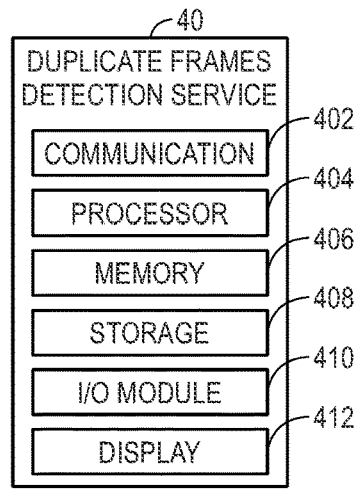

*FIG. 9*

DUPLICATE FRAMES DETECTION

CROSS REFERENCE RELATED TO APPLICATIONS

This application claims priority from and the benefit of U.S. Provisional Application Ser. No. 63/081,684, entitled "DUPLICATE FRAME DETECTION," filed Sep. 22, 2020. This U.S. Provisional Application is hereby incorporated by reference in its entirety for all purposes.

BACKGROUND

The present disclosure relates generally to content provision. More particularly, the present disclosure relates to systems and methods for detecting duplicate frames.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Content providers often use quality control systems to monitor properties of content (e.g., advertisements or any other media content) before and after being deployed via content presentation services. Quality control systems may monitor content based on quality requirements and subsequently deactivate problematic content when the problematic content does not meet certain thresholds or requirements of the content presentation services. In particular, some content may include duplicate frames, which may lead to visual issues during content playback, thereby interrupting user experience when viewing TV shows, movies, or any suitable form of media. Such duplicate frames may have been generated inadvertently by third-party servers (e.g., third party advertisers, third party vendors) when transcoding and encoding content. Further, some content presentation services may block content that has duplicate frames from streaming if the duplicate frames were generated without appropriate intent. As a result, content providers may lose advertising and monetary opportunities. Monitoring content for duplicate frames via manual intervention is not efficient and may result in a loss of time, resources, and revenue for content providers.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 7 depicts an example schematic depicting a duplicates array using a hashing algorithm, in accordance with an embodiment of the present disclosure;

FIG. 8 depicts another example schematic depicting an output based on the hashing algorithm of FIG. 7, in accordance with an embodiment of the present disclosure; and FIG. 9 illustrates example elements that are a part of a duplicate frames detection service, in accordance with an embodiment of the present disclosure.

DETAILED DESCRIPTION OF SPECIFIC EMBODIMENTS

Figure 1:
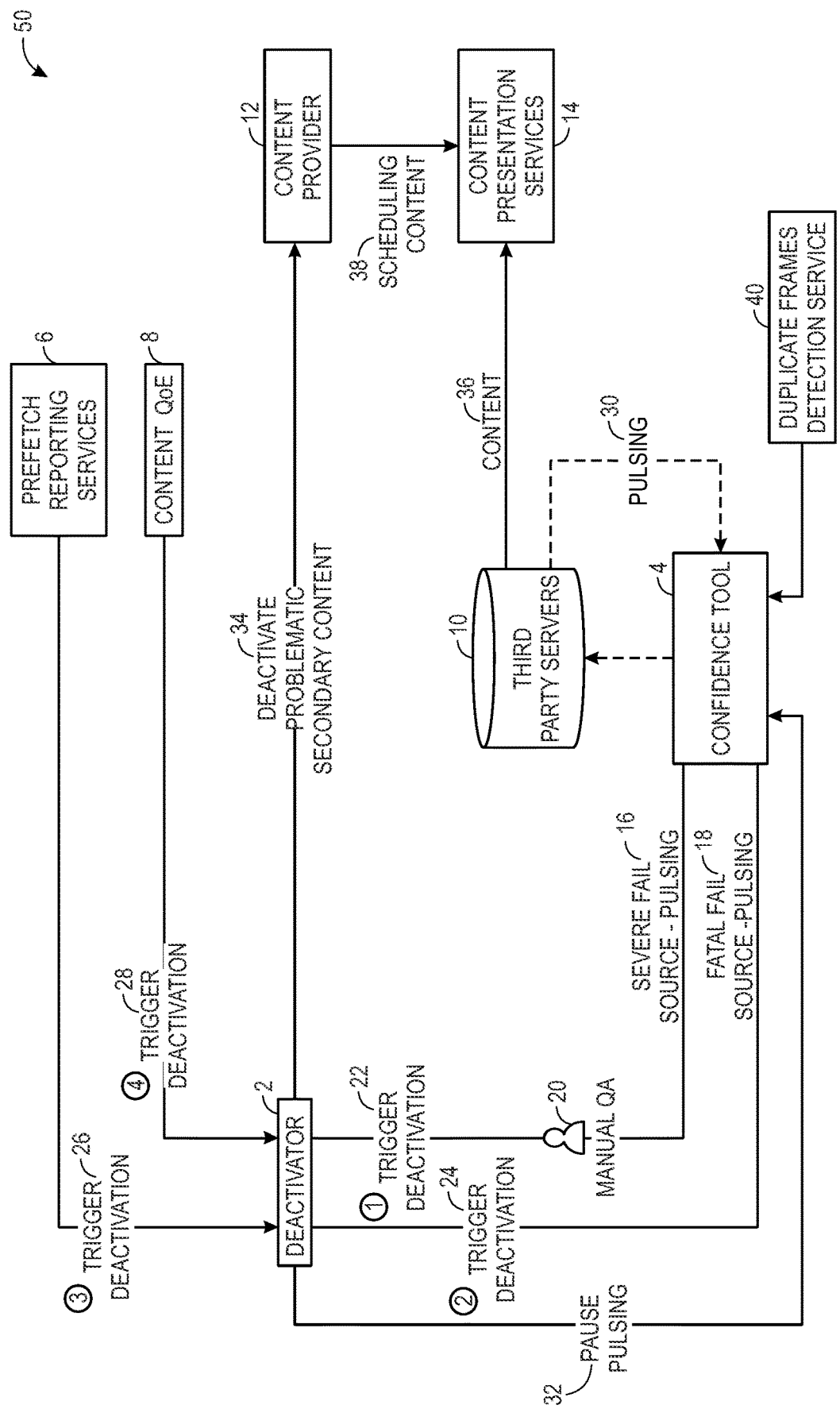
FIG. 1 illustrates a system that deactivates problematic content based on assessing quality of content, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

As discussed in greater detail below, the present embodiments described herein improve efficiencies in monitoring quality of content (e.g., advertisements, commercials, marketing content, or other media content) by detecting duplicate frames within content. Content may also be referred to as a creative. Before content is displayed via content presentation services, the content undergoes a quality control process to ensure that quality requirements are met. However, present quality control processes may not monitor content for duplicate frames. As used herein, duplicate frames may be defined as the same clip, frame, set of frames in a video, moving picture, or any suitable media occurring more than once where the repeated occurrences are located adjacent to one another. For example, frames 4 and 5 in a video may have the same image. Therefore, frames 4 and 5 may be duplicates. In some instances, content providers may create duplicate frames with creative intent or on purpose to present certain visual effects (e.g., time warp effect, for emphasis) during a video or content playback. However, as mentioned above, duplicate frames that are generated without intent may cause visual issues, interrupt user experience, and raise problems for content providers. Duplicate frames that are not generated on purpose may be referred to as duplicate frames without intent (or unintentional duplicate frames). For example, third-party servers (e.g., third party advertisers, third party vendors) may inadvertently create duplicate frames within content when transcoding and encoding the content not in a native or original frame rate. Such unintentional duplicate frames may lead to visual issues such a stuttering effect and/or jittery images during content playback. Along with visual issues, content may be blocked by many content presentation services if duplicate frames without intent are detected within the content. Blocking content with duplicate frames may result in monetary loss and reduction in advertising opportunities for content providers. Therefore, a duplicate frames detection service may be useful to content providers and improve user experience.

In some embodiments, the duplicate frames detection service may be automated and integrated with an existing quality control system. The duplicate frames detection service may convert frames of content into computer hashes. As used herein, a frame may be one of the many still images used to generate a video, moving image, or any suitable content. Based on analyzing respective hashes associated with each frame, the duplicate frames detection service may use an algorithm to detect patterns between adjacent frames. Detecting patterns between adjacent frames and respective hashes may indicate the presence of duplicate frames or up-conversion errors in content. Each frame may be associated with a unique hash, and hashes for each frame may be outputs of a hashing algorithm. That is, image or frame data, which is represented in binary form on a computer, is converted to a fixed length string (e.g., hash) after being converted by the hashing algorithm. By converting images and frames into hashes, a computing device or processor of the duplicate frames detection service may efficiently compare hashes between adjacent frames to detect duplicate frames, patterns, and up-conversion errors. As used herein, up-conversion involves increasing resolution of content.

Comparison of adjacent frames to detect duplicate frames may involve comparing the brightness of each pixel in a frame to the brightness of the corresponding pixel in an adjacent frame. If the brightness of pixels from the frame is the same compared to the pixels in the adjacent frame, the duplicate frames detection service may determine the frame is a duplicate of the adjacent frame. It is recognized that comparing adjacent frames by comparing respective hashes via machine-based processing and algorithms improves accuracy in detecting duplicate frames and may reduce human error and subjectivity resulting from manual computations. Further, machine-based processing and algorithms may provide insight that may not be attained via human estimating, by relying on complex data patterns/relationships that may not be conceived in the human mind. Furthermore, the duplicate frames detection service may be able to detect duplicate frames within portions of the content (as opposed to the entire piece of content), such as the first second or within the first 30 frames of content. By detecting any repeating patterns within the first second or within the first 30 frames of content, the duplicate frames detection service may be efficient in detecting duplicate frames without having to expend computing time and power on analyzing an entire content file or each frame of the content.

With the preceding in mind, the following figures relate to the system and process of controlling quality of content and/or deactivating problematic content by determining duplicate frames. Turning now to FIG. 1, a schematic diagram of an embodiment of a system 50 where embodiments of the present disclosure may operate, is illustrated. The system 50 may include a deactivator component 2 that may be an application program interface (API) designed to automatically deactivate problematic content and provide a notification (e.g., to a sales team of a content provider 12) by providing useful feedback regarding the problematic content. As used herein, the term API may be defined as a communication protocol between a client and a server or in other words an interface implemented by an application, which allows other applications to communicate with it. An API may include a set of functions, methods, classes, or protocols that an operating system, library, or service provides to support requests made by computer programs. As will be described in more detail below, the deactivator component 2 may trigger deactivations based on an indication of a modification to the content and/or a problem with the content. A confidence tool 4, a prefetch reporting service 6, a content quality of experience (QoE) 8, and/or any combination thereof may generate this indication and request the deactivator component 2 to deactivate the problematic content.

In one embodiment, the deactivator component 2 may receive an indication of problematic changes to content via the confidence tool 4. The confidence tool 4 may receive content from third party servers 10 (e.g., third party advertisers, third party vendors) that provide content to content presentation services 14. In some instances as indicated by arrow 36, the content provider 12 may have employed the third-party servers 10 to send content based on the needs and directions of the content provider 12 to the content presentation services 14. As indicated by arrow 38, the content provider 12 controls which content is deployed and when the content is deployed to the content presentation services 14, or in other words regulates scheduling information (e.g., duration of content, tracking beacons associated with the content, media type associated with the content) provided to the content presentation services 14. The third-party servers 10 may be associated with creative or ad agencies that create marketing campaigns, ads, secondary video content, or secondary audio content tailored to meet client needs. In some cases, the content received by the confidence tool 4 from the third-party servers 10 may not be live yet, or in other words has not been presented by content presentation services 14. The confidence tool 4 may serve as a quality control mechanism for such pre-live content (e.g., in flight content) as well as for content that is already live (e.g., active content). The confidence tool 4 performs pulsing 30, a mechanism that programmatically determines any changes made to received content. Pulsing 30 may be performed on a continuous or periodic basis (every 1 second, every 1 hour, once a day, twice a day, or any suitable time period). The pulsing 30 operation may enable the confidence tool 4 to determine whether various attributes of the content abide by certain quality criteria (e.g., criteria of the content provider 12 and/or an entity commissioning the creation/editing of the content). In an aspect, the confidence tool 4 may receive a signal from a duplicate frames detection service 40 that determines whether unintentional duplicate frames are present in the content. In another aspect, the duplicate frames detection service 40 may be incorporated into the confidence tool 4 rather than be a separate component.

When the quality criteria are not met (e.g., unintentional duplicate frames are detected), the confidence tool 4 may provide an indication to the deactivator component 2, triggering deactivation of the content that does not meet the quality criteria. In some instances, different types of deactivation triggers may be provided to the deactivator component 2. In some embodiments different trigger levels may be implemented to indicate a severity or other characteristics of the problematic content. In the depicted embodiment, the confidence tool 4 may invoke the deactivator component 2 via a first trigger deactivation 22 or a second trigger deactivation 24. The first trigger deactivation 22 is based on problematic content related to a severe fail 16 that, while may still allow playback of the content, may eventually lead to a fatal failure where playback is blocked. Examples of problematic content associated with the severe fail 16 may include severe pixilation issues or spikes in audio. In some instances, problematic content associated with the severe fail 16 may involve manual intervention 20. For instance, if a problematic content may be susceptible to spikes in audio, a person may be assigned to listen to and investigate particular regions of the content for any spikes in audio. Meanwhile, the second trigger deactivation 24 is based on problematic content related to a fatal fail 18. Examples of the fatal fail 18 may include bit rate issues with the problematic content or broken uniform resource locator (URL) associated with the problematic content. For example, after selecting a URL, information regarding the content is absent due to a domain or vendor issue. As a result, the content may be identified as problematic and be an example of the fatal fail 18. The above-mentioned examples of severe and fatal fails serve as non-limiting example, and parameters used to identify severe and fatal fails may be configurable. A more in-depth discussion entailing how the confidence tool 4 identifies problematic content based on pulsing will be described below.

Along with the confidence tool 4, another, the prefetch reporting service 6, may enable the deactivator component 2 to request deactivation of problematic content. The prefetch reporting service 6 generates or updates a content playback report based on data issued by the content provider 12 on a periodic basis (e.g., daily or any suitable time period). For example, the content playback report may contain data associated with the previous 32 hours or any suitable time period of content playback. The content playback report may include information related to the number of requests associated with the content (e.g., the amount of content expected to play) and the number of refreshes associated with the content (e.g., the amount of content actually played). Based on the information within the content playback report, the prefetch reporting service 6 may invoke the deactivator component 2 via a third deactivation trigger 26. For example, in some embodiments, if the ratio of an expected amount of a piece of content to be played to the amount of the piece of content that is actually played exceeds a prescribed threshold, this may indicate that the piece of content should be deactivated, as there is a discrepancy between the expected and actual playback (e.g., which may be caused by refusal of playback by the content provider 12). The ratio can be inversed as well (amount of content actually played compared to the amount of content expected to be played) in which case the content may be deactivated if the ratio is below a predetermined threshold.

In another embodiment, a fourth deactivation trigger 28 may invoke the deactivator component 2. The fourth deactivation trigger 28 may be generated by a content QoE 8. In some examples, the content QoE 8 may be referred to as video QoE. The statistics associated the content QoE 8 may help the deactivator component 2 identify and request deactivation of the problematic content. The content received by the content QoE 8 as well as by the prefetch reporting service 6 has been live, or in other words has been presented by content presentation services 14. The quality control features of the system 50 described above may not be limited to those discussed herein but rather the confidence tool 4, the prefetch reporting service 6, and the content QoE 8 are examples of monitoring quality of content. As indicated by arrow 34, the deactivator component 2 may request to the content provider 12 to deactivate the problematic content based on the trigger deactivations 22, 24, 26, 28, and any combination thereof.

Once problematic content has been deactivated, it may be unnecessary to check the content for problems again until the problems with the content have been fixed. In one embodiment, if the problematic content has been successfully deactivated, then the deactivator component 2 may request the confidence tool 4 to pause pulsing of the now deactivated problematic content as indicated by arrow 32. Subsequently, prior to re-activation of the content (e.g., after fixing the problems with the content), the pulsing may be re-activated.

Before content is displayed via content presentation services, the content undergoes a quality control process to ensure that quality requirements are met. However, even after content that is deemed to have passed a quality control inspection, third-party servers 10 (e.g., third party advertisers, third party vendors) may modify or add to a content file (e.g., video ad serving template (VAST)). A content file may contain one or multiple content and may include information about the content regarding bit rate, pixel size, duration, resolution, and so forth. Each content file may be associated with a content tag (e.g., VAST tag).

Conventional quality control systems involve manual intervention to check quality or changes in the content file and tag. Monitoring content in an efficient manner such that any modifications to the content file and tag by third-party servers are accurately detected continues to pose problems despite manual intervention efforts to control quality. As a result, a system that automatically monitors (e.g., pulses) content for any changes by third-party servers 10 and subsequently deactivates problematic content files may improve user experience in relation to viewing content and enhance revenue gains for the content provider. For example, the confidence tool 4 may identify problematic changes to a content file and tag via a pulsing mechanism, in which the content file and tag are identified for deactivation until changes to the content file and tag meet the specification of the content presentation services. Active (e.g., live) or in-flight (e.g., scheduled to be live) content files may continue being pulsed for any modifications unless they have been deactivated.

The pulsing mechanism is a component of the automated quality control workflow associated with the confidence tool 4. In an aspect, the pulsing mechanism may also determine whether there are unintentional duplicate frames in the content. This automated quality control workflow includes interaction between a translator cloud (e.g., a user interface), a confidence tool cloud (e.g., decision-making component), a quality control system, a spot checking tool, and a content provider server. The translator cloud may be a user interface that the content provider (e.g., sales operation team) interacts with. Further, the translator cloud maintains a history of quality control associated with each content tag. To initiate the quality control process, the sales operation team may create a work order by entering metadata (e.g., tag URL, start date, advertiser) associated with the content tag received by the confidence tool from third-party servers. After the work order has been validated within the confidence tool cloud, the content tag is analyzed for quality via a quality control system or manually checked via a spot checking tool. The quality control (QC) results (e.g., QC fail, QC pass) associated with the content tag are determined by the translator cloud. A message or notification indicating the QC results may be displayed via the translator cloud. The automated quality control workflow enables the sales operation team to check a work order history that includes QC results, deactivated status, pulsing status and so forth near or real-time.

Figure 2A:
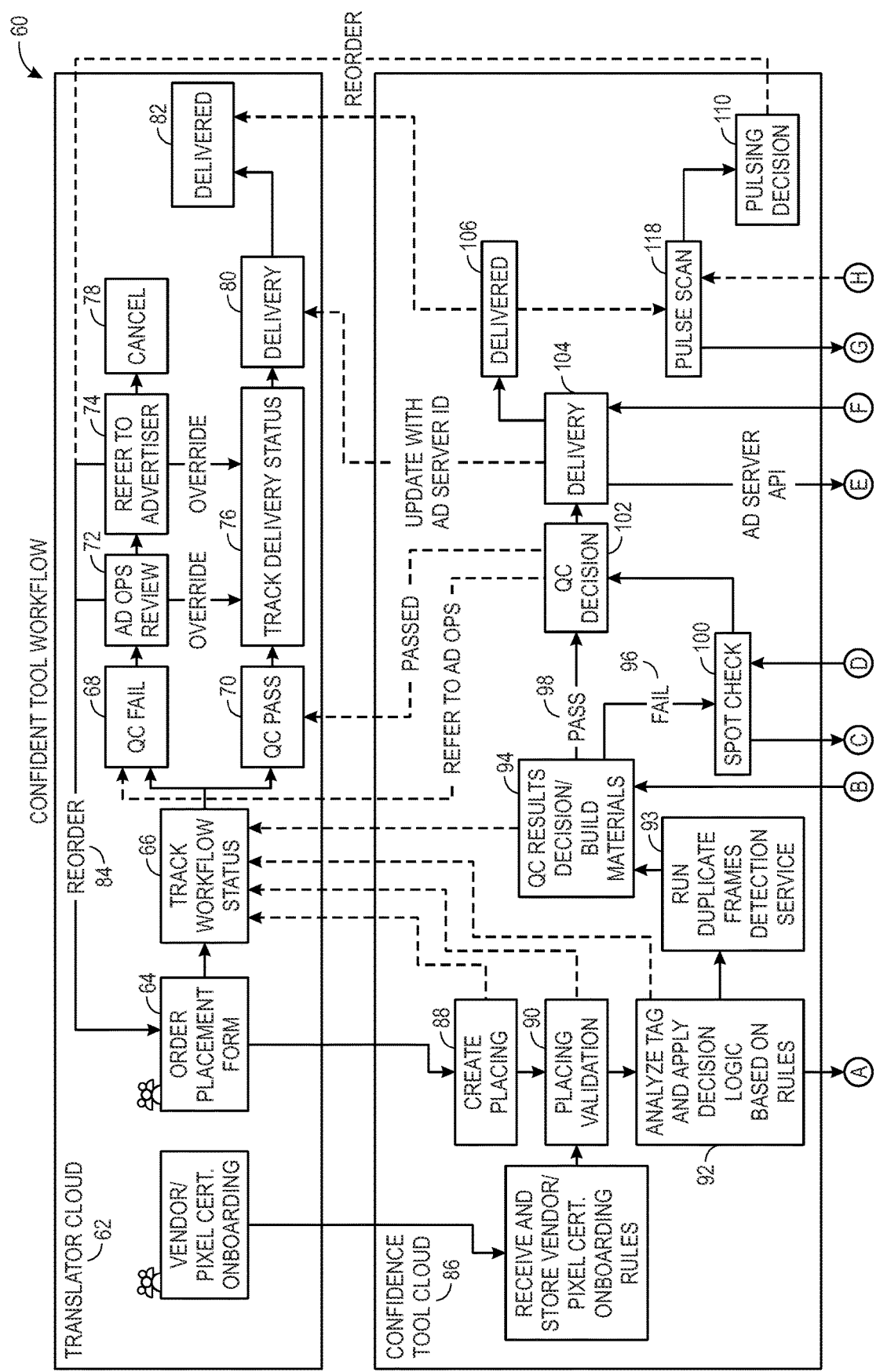
FIG. 2A depicts a translator cloud and a confidence tool cloud of a quality control workflow associated with a confidence tool from the system in FIG. 1, in accordance with an embodiment of the present disclosure.
Figure 2B:
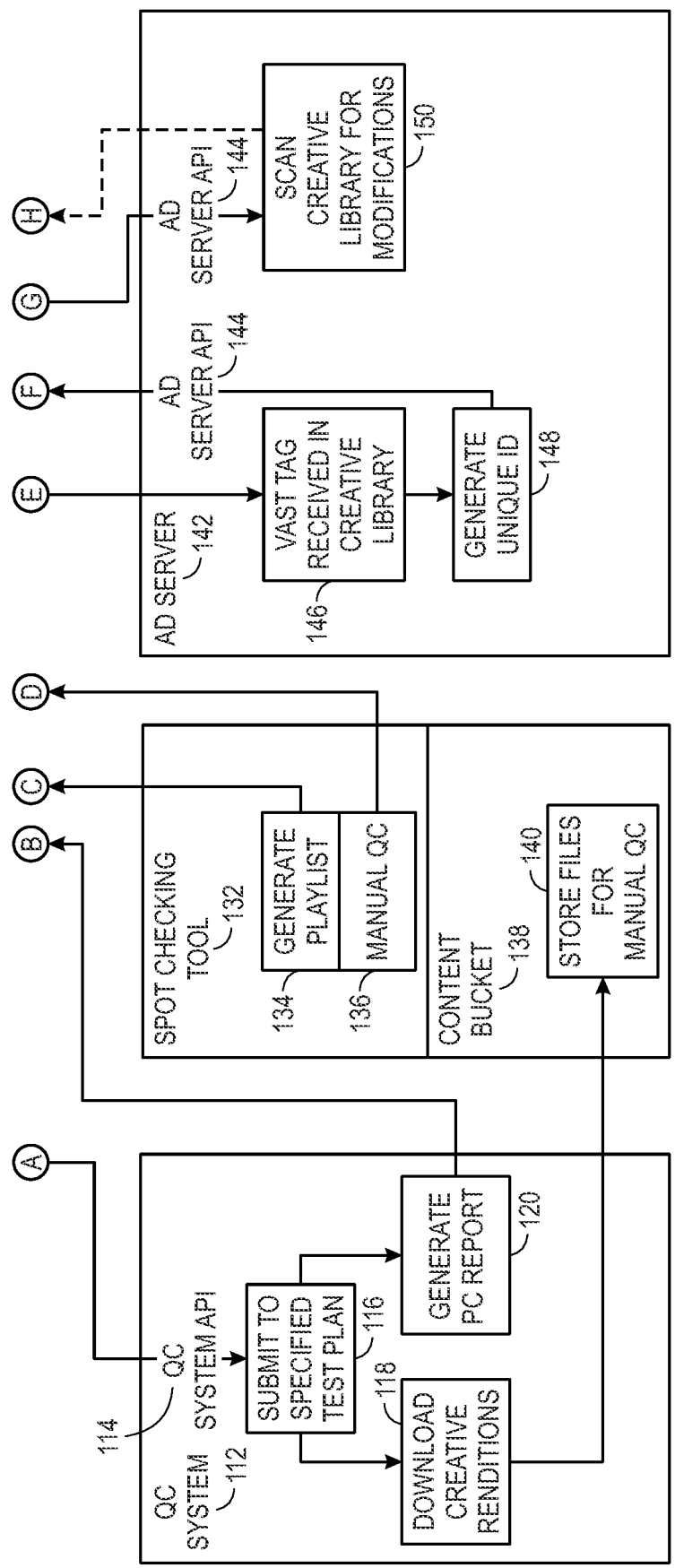
FIG. 2B depicts a quality control system, a spot checking tool, and a content provider server of the quality control workflow from FIG. 2A, in accordance with an embodiment of the present disclosure.

As mentioned above, the confidence tool 4 is a component of the automated quality control workflow. The confidence tool 4 ensures that content even after being modified by third-party servers meets the quality requirements of content presentation services 14. The confidence tool 4 may receive content tags associated with content files from third-party servers. A content file may contain one or more content and may include information about the content regarding bit rate, pixel size, duration, resolution, and so forth. The content file is a data structure that uses an XML format to describe one or more content to be displayed via a video player. A video player is an environment in which video content may be played. The automated quality control workflow monitors the quality of content associated with each content tag received by the confidence tool 4. In some embodiments, as described in further detail below, the duplicate frames detection service 40, which is a stand-alone service of the quality control workflow, may be integrated or coupled to the confidence tool 4. With the preceding in mind, FIGS. 2A and FIG. 2B illustrate the quality control workflow associated with the confident tool 4. Non-limiting components of the confidence tool workflow 60 include a translator cloud 62, a confidence tool cloud 86, a QC system 112, a spot checking tool 132, and a content provider server 142. In particular, FIG. 2A depicts the translator cloud 62 and a confidence tool cloud 86, and FIG. 2B depicts the QC system 112, the spot checking tool 132, and the content provider server 142.

The translator cloud 62 serves as a user interface that the content provider (e.g., sales operation team) or a user may interact with. For example, a user may select a link or image that includes a tracking pixel via the user interface (block 63). The information stored based on the tracking pixel may be received and analyzed by the confidence tool cloud 86 (block 87). Information such as type of client or vendor used, user's screen resolution, user's IP address, and the like may be received by the confidence tool cloud 86. Further, the translator cloud 62 maintains a history of work orders, QC results, and other QC checks associated with each content tag. As a result, the automated quality control workflow enables the sales operation team to review a work order history, QC results, and other QC checks associated with the content tag via the translator cloud 62 in near or real-time. In order to initiate the process of quality control for a content tag, the sales operation team may create a work order by entering metadata (e.g., tag URL, start date, advertiser) associated with the received content tag via the order placement form 64. The order placement form 64 is submitted in the translator cloud 62 and is associated with an order data type. The order data type may be in the format of a string and may include input fields such as name and ID of advertiser, start and end time of content, name and ID of campaign, name of vendor, vertical (e.g., industry in which vendors offer goods and services), type of content file, and so forth. A campaign may be defined as a series of content for a particular theme or marketing platform. Based on the inputted information, a content URL or unique ID may be outputted due to the order data type. The content URL or unique ID may be used to analyze quality of respective content. Since the translator cloud 62 serves as a user interface, the sales operation team of the content provider 12 may be able to interact with a computer in a visual way using items such as windows, icons, menus, and so forth.

After the work order has been created in the translator cloud 62, a placing is created in the confidence tool cloud 86, which controls QC results and decision-making in regard to the content tags. As described further, the confidence tool cloud 86 updates the user interface of the translator cloud 62 and communicates with a QC system 112, the spot checking tool 132, the content provider server 142. Placing validation 90 may be performed to verify that the content tag is certified, can be properly parsed, and can be passed on to other steps of the QC process. If the placing is not valid or the content tag does not pass, a message indicating an error workflow status may be displayed via the translator cloud 62. After the placing is determined to be valid, the content tag may be analyzed based on rules or testing parameters (block 92). The rules or the testing parameters may be configurable based on the type of content associated with the content tag. Content with a higher risk or higher sensitivity (e.g., child protected content) may have different parameters compared to content with lower risk or lower sensitivity (e.g., ad re-runs) In some embodiments, the parameters may be set by requirements or other criteria of the content provider 12 or an entity commissioning the content. Examples of such parameters include but are not limited to minimum bit rate, aspect ratio, resolution, frame rate, color space, and format specifications. In additional embodiments, the threshold requirements are based on third-party servers 10 who sent the content tags or may be set to meet criteria of content presentation services 14. Flexibility in changing testing parameters for various types of content and content tags allows for a variety of content and content tags to be monitored for quality. In some embodiments, the confidence tool cloud 86 may be integrated with the duplicate frames detection service 40. As such, after analyzing the content tag based on rules or testing parameters (block 92), the content may be evaluated via the duplicate frames detection service 40 to detect any duplicate frames (block 93).

Based on the rules or testing parameters, the QC system 112 may analyze the content tags received from third-party servers. The QC system 112 may be a third-party tool or may be a part of the confidence tool 4. Further, the QC system 112 may be an application program interface (API) (block 114) designed to automatically check the quality of content tag based on particular testing parameters. As used herein, the term API may be defined as a communication protocol between a client and a server or in other words an interface implemented by an application, which allows other applications to communicate with it. An API may include a set of functions, methods, classes, or protocols that an operating system, library, or service provides to support requests made by computer programs.

The QC system 112 may submit a test plan (block 116) that includes threshold requirements that may be set by requirements or other criteria of the content provider 12 or an entity commissioning the content. Examples of such requirements include but are not limited to minimum bit rate, aspect ratio, resolution, frame rate, color space, and format specifications. In some embodiments, the threshold requirements are based on third-party servers 10 who sent the content tags or may be set to meet criteria of content presentation services 14. For example, threshold requirements may be set by modeling or simulation techniques based on analyzing a history or record of data collected from the content presentation services 14. The QC system 112 may download renditions of content (block 118) and generate a QC report (block 120) based on the test plan. Downloading renditions of content is an example of a job data type. The job data type may be in a format of a string, number, and/or object. Input fields of the job data type may include unique identifier for the job, type of job, priority of job, time of job creation, and so forth. Status and attributes from the job execution may be outputted based on the job data type. The downloaded renditions of content may be stored in a content bucket 138. As discussed below, the stored files of content may be used for manual QC as indicated by 140.

As indicated by block 94, content tags may be evaluated to determine a QC result (e.g., QC pass, QC fail). In some embodiments, a QC result may be determined based on the presence of duplicate frames. In some instances, duplicate frames (e.g., duplicate frames generated without intent) may result in a QC fail. In other instances duplicate frames (e.g., duplicate frames generated with intent) may result in a QC pass. Further discussion of duplicate frames will be provided in the detailed description corresponding to the subsequent figures. Content tags that meet quality criteria and threshold requirements set by the content provider 12, may pass the QC process as indicated by 98. As a result, the QC decision 102 may indicate a pass for the content. Content tags that fail to meet quality criteria and threshold requirements set by the content provider, may fail the QC process as indicated by step 96. If the QC report (block 120) includes details that the confidence tool cloud 86 determines a QC fail (step 96) for a content tag, then the QC failed content tag may be checked again via a spot check 100. The spot check 100 includes the spot checking tool 132. The spot checking tool 132 generates a playlist of the failed content (block 134). Based on the playlist, the spot checking tool 132 checks the failed content tags via manual QC. Manual QC is another example that uses a job data type. Again, the confidence tool cloud 86 determines a QC decision as to whether the previously failed content has failed again or passed. If the previously failed content has failed again, then the confident tool cloud 86 sets the QC decision to an overall fail for the previously failed content tag.

After the QC decision is complete, a message (e.g., track work flow status 66) indicating a pass or fail is sent to the translator cloud 62. An indication of a QC fail (block 68) or a QC pass (block 70) is displayed via the user interface of the translator cloud 62. In particular, the track workflow status is updated in the user interface of the translator cloud 62 as content tags move along the QC process. The track workflow status may be associated with the ad summary data type and the QC comments data type. The ad summary data type may be in the format of a string. Further the ad summary data type may specify the order, the content, the rendition, and status of QC results. Furthermore, the QC comments data type may be in the format of a string and/or object. The QC comments data type may specify description of comment, severity of QC warning, system at which comment is created, start time code, end time code, type of QC comment, vendor pixel data, and so forth.

After an indication of a QC fail (block 68) or a QC pass (block 70) is displayed via the user interface of the translator cloud 62, the content tag may be delivered or canceled in the translator cloud 62. If there is an indication of a QC fail, the order (e.g., content tag) may be resubmitted to undergo the QC process again (block 72), referred to an advertiser, which puts the order on hold until a decision is made (block 74), may be overridden to a QC pass, or may be canceled (block 78). In some embodiments, if the QC fail decision is overridden, the content tag may be delivered (block 80). The track delivery status 76 provides a status of the delivery of the content tag after it has been indicated as a QC pass. A QC pass or QC fail is determined based on comparing attributes of the content tag with quality criteria or testing parameters as discussed below.

Before the content tag is delivered (block 80), it undergoes a delivery process 104 in the confidence tool cloud 86. A content provider server 141, also referred to as an ad server API 144, may add the content tag to its content library (block 146). The content provider server 141 may be an API (content provider server API 144). If the confidence tool cloud 86 delivery is successful, then the content provider server 141 automatically generates a unique ID (block 148) that is sent back to the confidence tool cloud 86 via the content provider server API 144. As a result, the placing status is changed to "delivered" in the confidence tool cloud 86. This delivered placing status is sent to the translator cloud 62, which then displays the delivered status via the user interface.

As mentioned above, even after content that is deemed to have passed a quality control inspection, third-party servers (e.g., third party advertisers, third party vendors) may modify or add to a content file (e.g., VAST). A content file may contain one or multiple contents and may include information about the content regarding bit rate, pixel size, duration, resolution, and so forth. Each content file may be associated with a content tag (e.g., VAST tag). Therefore, active (e.g., live) and in-flight (e.g., scheduled to be live) content tags that are eligible may be pulsed (block 108) for any changes via the confidence tool 4 or the confidence tool cloud 86. The confidence tool cloud 86 performs pulsing to programmatically determine any changes made to the received content tags from third-party servers. Pulsing may be performed on a continuous or periodic basis (every 1 second, every 1 hour, once a day, twice a day or any suitable time period).

After the confidence tool 4 communicates with the content provider server API 144 to confirm eligibility (e.g., active, in-flight) of the content tag, the confidence tool 4 may scan a content library for any changes to the content tag (block 150). If changes to the content tag are identified, the confidence tool 4 submits the content tag to the confidence tool workflow 60 again to be checked or monitored for quality. Based on determining whether various attributes of the content tag abides by certain quality criteria (e.g., criteria of the content provider server 142 and/or an entity commissioning the creation/editing of the content), the confidence tool cloud 86 makes a decision 110 to continue pulsing or deactivate the content tag. When attributes of the content tag do not meet quality criteria, the confidence tool cloud 86 may provide an indication to the deactivator component 2, triggering deactivation of the content tags that do not meet the quality criteria.

Figure 3:
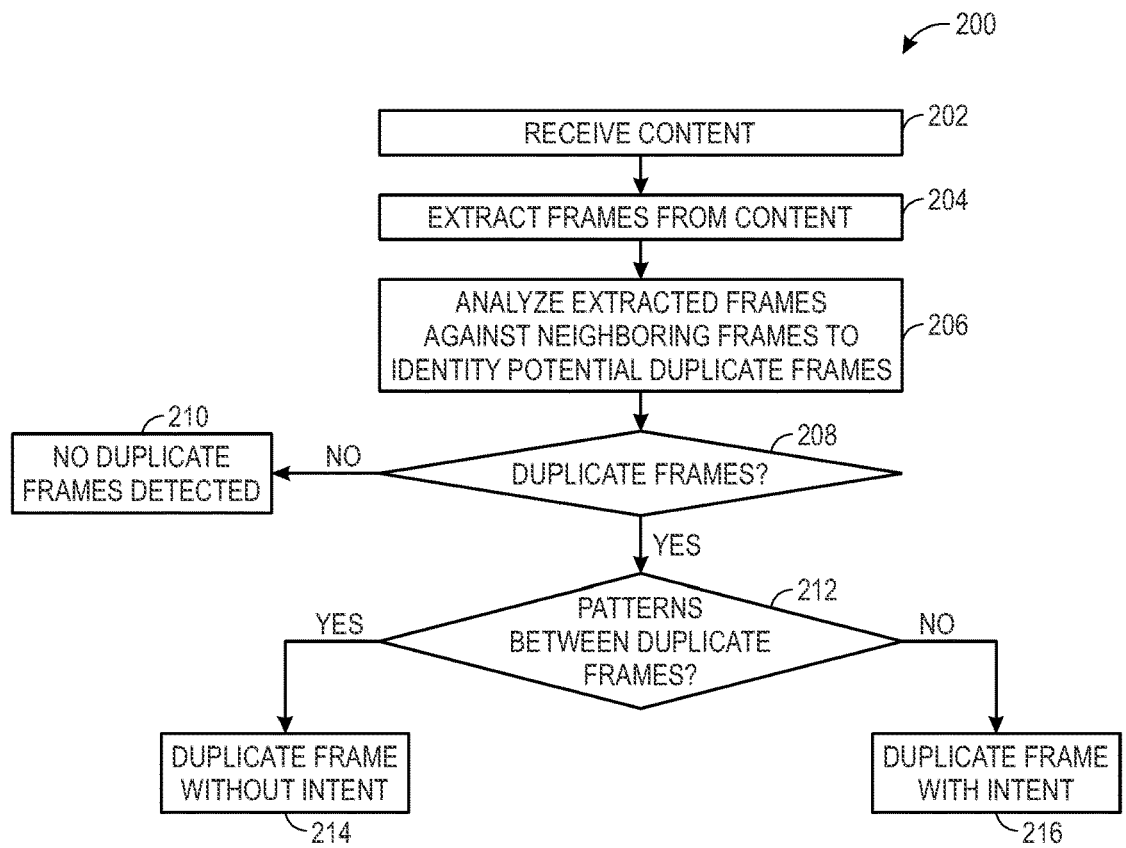
FIG. 3 depicts a flow chart of a process for detecting duplicate frames with respect to the quality control workflow from FIGS. 2A and 2B, in accordance with an embodiment of the present disclosure.

With the preceding in mind, FIG. 3 is a flow chart of a process 200 associated with determining duplicate frames within content, in accordance with an embodiment of the present disclosure. The process 200 may be performed by any suitable device such as the duplicate frames detection service 40 or the confidence tool 4 that may detect duplicate frames. While the process 200 is described using steps in a specific sequence, it should be understood that the present disclosure contemplates that the described steps may be performed in different sequences than the sequence illustrated, and certain described steps may be skipped or not performed altogether. In some embodiments, the process 200 may be implemented by executing instructions stored in a tangible, non-transitory, computer-readable medium within the confidence tool 4. In some embodiments, the duplicate frames detection service 40 may be integrated with the confidence tool 4. As a result, detecting duplicate frames may serve as another quality check for content within the quality control system 112 of FIGS. 2A and 2B.

The duplicate frames detection service 40 may receive content or extracted frames from the content via the quality control system 112. In some embodiments, after receiving content such as video clips and moving images (block 202), the duplicate frames detection service 40 may extract any number of frames from the content (block 204). The frame extraction process may involve converting color from images or frames of content to a binary array. By way of example, the duplicate frames detection service 40 may convert an image or frame to grayscale and resize the image or frame. For example, the image may be resized to 17 by 16 pixels in order to generate a 256-bit hash. As mentioned above, a hashing algorithm may be used to convert each image or frame into a hash. By converting images and frames into hashes, a computing device or processor of the duplicate frames detection service 40 may efficiently compare hashes between adjacent frames to detect duplicate frames, patterns, and up-conversion errors. While any suitable type of hashing algorithm may be used to convert data from each frame into hashes, in some embodiments, the duplicate frames detection service 40 may implement a difference hashing algorithm. With respect to the difference hashing algorithm, each pixel is compared to an adjacent pixel in a frame to build a binary relative gradient between pixels, and thereby generate a hash for each frame. This binary relative gradient may be stored as a single-dimensional array.

The generated hashes indicative of adjacent frames may be compared to detect duplicate frames (block 206). Comparison of the generated hashes indicative of adjacent frames to detect duplicate frames may involve comparing each value in a first hash (e.g., the brightness of each pixel in a frame) to each value in a second hash (e.g., the brightness of each corresponding pixel in an adjacent frame). If values in the first hash correlate with corresponding values in the second hash (e.g., the brightness of pixels from the present frame is the same compared to the pixels in an adjacent frame), the duplicate frames detection service 40 may determine the present frame to be a duplicate of the adjacent frame and assign a binary value of 1 to the present frame. On the other hand, if the values in the first hash do not correlate with corresponding values in the second hash (e.g., the brightness of pixels from the present frame varies compared to the pixels in the adjacent frame), the duplicate frames detection service 40 may determine the present frame is not a duplicate of the adjacent frame and assign a binary value of 0 to the present frame. As mentioned previously, comparing adjacent frames by comparing respective hashes via machine-based processing and algorithms improves accuracy in detecting duplicate frames and may reduce human error and subjectivity resulting from manual computations. Further details on how the difference hashing algorithm enables the duplicate frames detection service 40 to determine whether or not present frames are duplicates of adjacent frames will be provided below.

After frames within the content are identified as duplicates or not duplicates (block 208), the duplicate frames detection service 40 may generate an array with binary values assigned to each frame. When the frames of a content are not determined to be duplicates, a notification indicating no duplicate frames detected may be provided to the content provider 12 or a client (block 210). When duplicate frames are detected, the duplicate frames detection service 40 may algorithmically determine patterns amongst the identified duplicate frames (block 212). In one embodiment, the duplicate frames detection service 40 may determine a pattern or a frequency at which duplicate frames are detected. For example, the duplicate frame detection service 40 may determine that every fifth frame in a content is a duplicate frame. If the duplicate frames detection service 40 determines patterns between the identified duplicate frames (e.g., duplicate frames are detected with a particular frequency, duplicate frames are detected with a particular frequency that is greater than or less than frequency threshold), then the duplicate frames detection service 40 may determine the content includes duplicate frames without intent (block 214). As mentioned above, frames duplicated without intent may be a result of up-conversion errors or accidental human errors. With respect to human errors, duplicate frames without intent may have been generated by third-party servers (e.g., third party advertisers, third party vendors) when transcoding and encoding content. If the duplicate frames detection service 40 does not determine patterns between the identified duplicate frames, then the duplicate frames detection service 40 may determine the content includes duplicate frames created with intent (block 216). A detailed on determining patterns amongst duplicate frames will be discussed below.

Figure 4:
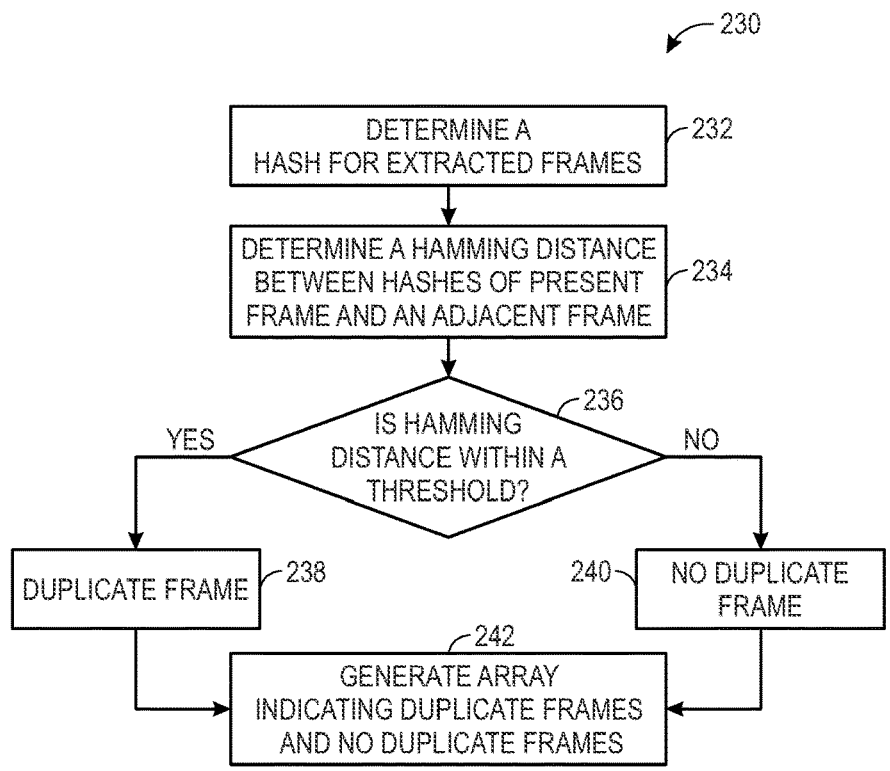
FIG. 4 depicts a flow chart of a process for determining duplicate frames of FIG. 3 based on a hamming distance, in accordance with an embodiment of the present disclosure.

FIG. 4 is a flow chart of a process 230 associated with determining duplicate frames via the difference hashing algorithm and computing a hamming distance, in accordance with an embodiment of the present disclosure. The process 230 may be performed by any suitable device such as the duplicate frames detection service 40 or the confidence tool 4 that may detect duplicate frames. While the process 230 is described using steps in a specific sequence, it should be understood that the present disclosure contemplates that the described steps may be performed in different sequences than the sequence illustrated, and certain described steps may be skipped or not performed altogether. In some embodiments, the process 230 may be implemented by executing instructions stored in a tangible, non-transitory, computer-readable medium within the confidence tool 4.

Moreover, FIG. 4 is an instance of blocks 206 and 208 of FIG. 3, and thereby expands upon how duplicate frames are detected using the hamming distance after generating a hash for each extracted frame. As indicated in FIG. 3, the duplicate frames detection service 40 may determine a hash for extracted frames of a content (block 232). In turn, the duplicate frames detection service 40 may compare a present frame with an adjacent frame by calculating a hamming distance between a hash associated with the present frame and a hash associated with the adjacent frame (block 234). As used herein, the hamming distance is a metric for comparing two data strings or hashes (e.g., binary data or hashes). That is, the hamming distance is the number of bit positions in which the two hashes are different. The duplicate frames detection service 40 may determine whether the hamming distance is within a threshold (block 236). For example, if the hamming distance is within a threshold, then the duplicate frames detection service 40 may determine the present frame is a duplicate of the adjacent frame (block 238). If the hamming distance is not within a threshold, then the duplicate frames detection service 40 may determine the present frame is not a duplicate of the adjacent frame (block 240). In some embodiments, the threshold may be 6 bits. In other embodiments, the threshold may be configurable.

By way of example, if the hamming distance is calculated as 5 and the threshold is 6 bits, then the present frame varies by 5 bits compared to the adjacent frame. Because the hamming distance of 5 is less than the threshold of 6 bits, the duplicate frames detection service 40 may determine the present frame is a duplicate of the adjacent frame (or the previous frame). Thus, the duplicate frames detection service 40 may assign a binary value of 1 to the present frame. On the other hand, if the hamming distance is 6 or greater than 6, then the present frame varies by 6 or more than 6 bits compared to the adjacent frame. Because the hamming distance of 6 or greater than 6 does not meet the threshold, the duplicate frames detection service 40 may determine the present frame is not a duplicate of the adjacent frame. Thus, the duplicate frames detection service 40 may assign a binary value of 0 to the present frame. This assignment of binary values (e.g., 0, 1) based on whether the present frame is a not duplicate or a duplicate may be stored in a single dimensional array (block 242).

Figure 5:
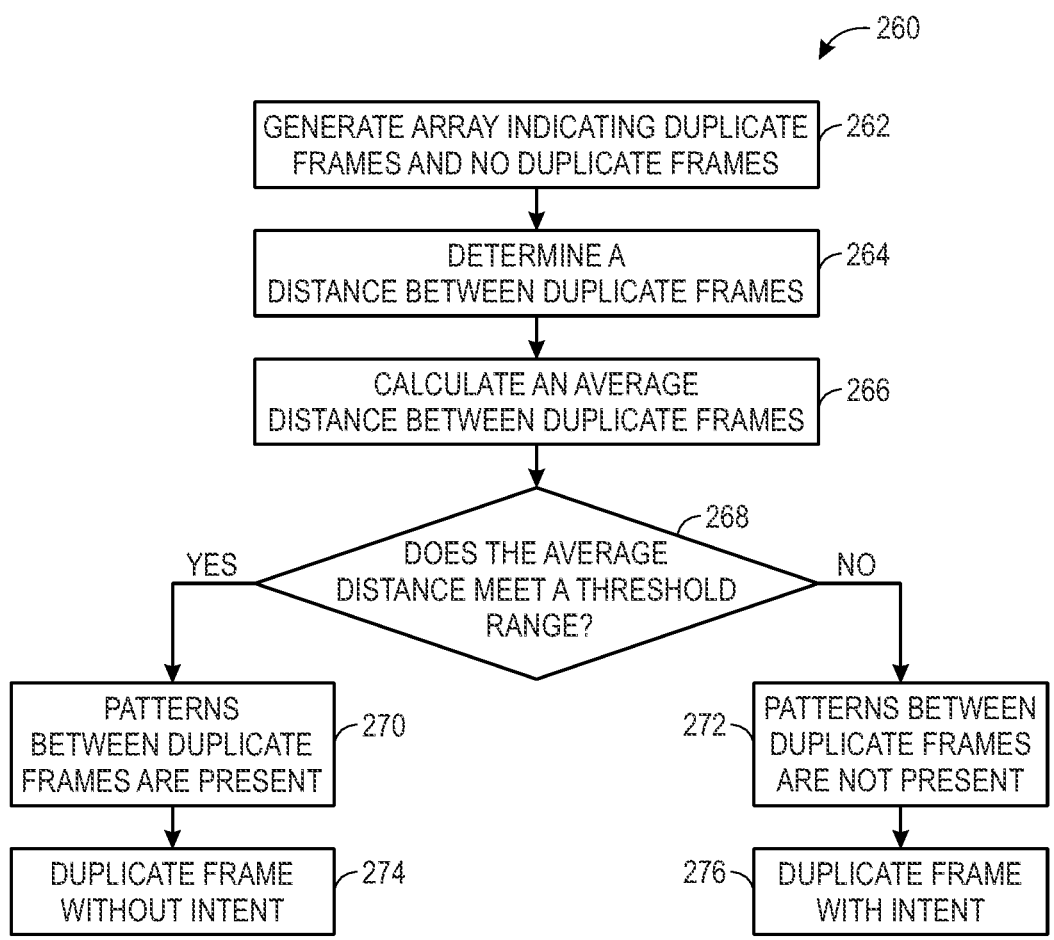
FIG. 5 depicts a flow chart of a process for determining duplicate frames with or without intent based on an average distance between duplicate frames of FIG. 4, in accordance with an embodiment of the present disclosure.

FIG. 5 is a flow chart of a process 260 associated with determining duplicate frames generated with intent or without intent, in accordance with an embodiment of the present disclosure. Moreover, FIG. 5 corresponds to block 212 of FIG. 3; therefore, the following description provides further details regarding how a threshold distance between duplicate frames is used to determine whether a duplicate frame was created with intent or without intent. The process 260 may be performed by any suitable device such as the duplicate frames detection service 40 or the confidence tool 4 that may detect duplicate frames. While the process 260 is described using steps in a specific sequence, it should be understood that the present disclosure contemplates that the described steps may be performed in different sequences than the sequence illustrated, and certain described steps may be skipped or not performed altogether. In some embodiments, the process 260 may be implemented by executing instructions stored in a tangible, non-transitory, computer-readable medium within the confidence tool 4.

As indicated in FIG. 5, the duplicate frames detection service 40 may generate an array of binary values that indicate whether the extracted frames of the content are duplicates or not duplicates (block 262). A binary value of 1 indicates the present frame is a duplicate of the adjacent frame. That is, pixels in the present frame are the same in brightness compared to the corresponding pixels in the adjacent frame (or at least the brightness is similar enough based on the hamming distance). Meanwhile, a binary value of 0 indicates the present frame is not a duplicate of the adjacent frame. That is, pixels in the present frame differ in brightness compared to the corresponding pixels in the adjacent frame. After identifying which extracted frames are duplicates based on the array and the process described in FIG. 4, for example, the duplicate frames detection service 40 may calculate the frame distance between duplicate frames (block 264). Based on the distance between each duplicate frame, the duplicate frames detection service 40 may average the frame distance between duplicate frames (block 266). For example, there may be a distance of five frames between duplicate frames; or in other words, every fifth frame of the extracted frames of a content may be a duplicate frame. The duplicate frames detection service 40 may determine whether the average frame distance meets a threshold range (block 268). In some embodiments, the threshold range may be between 4 and 7 frames, inclusive. In other embodiments, the threshold range may be configurable based on sample size or the number of frames. For example, if the number of frames increase, the upper bound of the threshold range may also be higher (e.g., upper bound greater than 7). If the average frame distance is within the threshold range, then the duplicate frames detection service 40 may determine that patterns are present between duplicate frames (block 270). As such, presence of patterns may be indicative of the duplicate frames without intent (block 274).

In response to determining duplicate frames without intent in the content, the duplicate frames detection service 40 may notify the content providers 12, the confidence tool 4, the client, and/or the like regarding the presence of duplicate frames created without intent and associated issues. In some embodiments, after being notified of the presence of the duplicate frames without intent, the confidence tool 4 may trigger the deactivator component 2 from FIG. 1 to deactivate the content associated with the duplicate frames without intent. In other embodiments, the content with the duplicate frames without intent may be modified or corrected to remove the duplicate frames without intent from the content.

If the average frame distance is not within the threshold range, then the duplicate frames detection service 40 may determine that patterns are not present between duplicate frames (block 272). As such, the lack of patterns may be indicative of the duplicate frames with intent (block 276). For example, if the average frame distance is equal to 1 frame, then the duplicate frames detection service 40 may determine that the duplicate frames were created with intent. In other embodiments, if the average frame distance is greater than 1 frame but less than 4 frames, then the average frame distance may not be within threshold range. However, the duplicate frames associated with the average frame distance of greater than 1 frame but less than 4 frames may still be flagged as created with intent.

Along with displaying the presence of duplicates or no duplicates, the duplicate frames detection service 40 may display whether the duplicate frames were generated with or without intent, a total number of duplicates detected within content, a duplicates array, average duplicate frame rate, an indication of whether issues are detected based on duplicate frame, and the like. As mentioned above, it can be appreciated that comparing adjacent frames by computing the hamming distance and the average frame distance between duplicates via machine-based processing and algorithms improves accuracy in detecting duplicate frames and may reduce human error and subjectivity resulting from manual computations. Further, machine-based processing and algorithms may provide insight (e.g., whether the duplicate frames were created with or without intent) that may not be attained via human estimating, by relying on complex data patterns/relationships that may not be conceived in the human mind.

Figure 6:
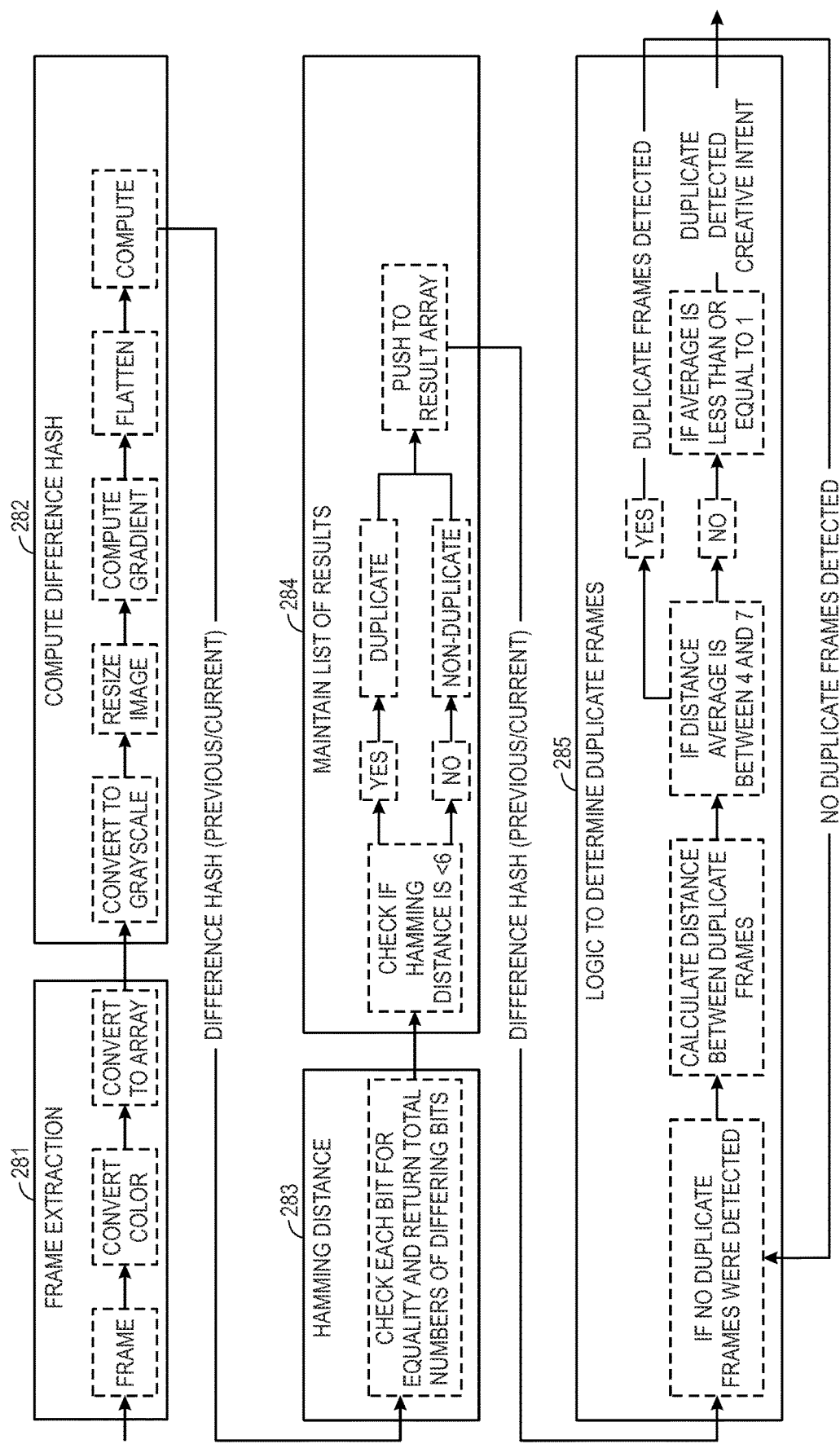
FIG. 6 depicts a block diagram corresponding to the process of FIG. 3 for detecting duplicate frames.

With the foregoing in mind, FIG. 6 depicts a block diagram of a system 280 for detecting duplicate frames and determining whether the duplicate frames were created with intent or without intent. FIG. 6 provides a system level overview of the processes 200, 230, and 260 described in FIGS. 3-5. After the duplicate frames detection service 40 of the system 280 receives content from the quality control system 112 or directly form the content provider 12, the content undergoes frame extraction (block 281). During frame extraction, the duplicate frames detection service 40 may extract any number of frames from the content. For example, the duplicate frames detection service 40 may extract each frame within the content or a subset of frames such as the frames corresponding to the first to ten seconds of the content. After extracting the frames from the content, the duplicate frames detection service 40 may convert color from images or frames of the content to a grayscale. Additionally, the duplicate frames detection service 40 may resize each frame to 17 by 16 pixels in order to generate a hash (e.g., 256 bit hash) for each frame via a hashing algorithm. To build a hash for each frame, each pixel may be compared to an adjacent pixel in the same frame or image via a difference hashing algorithm (block 282).

At block 282, the duplicate frames detection service 40 may generate a binary relative gradient for each frame by comparing adjacent pixels within each frame. Generating a binary relative gradient and subsequently a hash for each frame may involve comparing the brightness of each pixel in a frame to the brightness of an adjacent pixel (or previous pixel) in the frame. If the brightness of a present pixel in the frame is the same compared to an adjacent pixel in the frame, the duplicate frames detection service 40 may determine the present pixel to be a duplicate of the adjacent pixel and assign a binary value of 1 to the present pixel. On the other hand, if the brightness of the present pixel in the frame varies compared to the adjacent pixel in the frame, the duplicate frames detection service 40 may determine the present pixel is not a duplicate of the adjacent pixel and assign a binary value of 0 to the present pixel. The duplicate frames detection service 40 performs this pixel comparison process via a difference hashing algorithm until a binary relative gradient or matrix is generated for a frame or image. In some embodiments, the duplicate frames detection service 40 may flatten the generated matrix into a single dimension array indicative of a hash. The duplicate frames detection service 40 may compute a hash for each frame by converting each Boolean value (e.g., 0, 1) of the frame into a 256-bit integer.

After calculating a hash for each frame, the duplicate frames detection service 40 may compare a present frame with an adjacent frame by calculating a hamming distance between a hash associated with the present frame and a hash associated with the adjacent or previous frame (block 283). The hamming distance is the number of bit positions in which the two hashes corresponding to adjacent frames are different.

Block 284 of the system 280 may correspond to the process 230 of FIG. 4. At block 284, the duplicate frames detection service 40 may determine whether the present frame is a duplicate of the adjacent or previous frame by analyzing the hamming distance with respect to a threshold. For example, if the hamming distance is within a threshold, then the duplicate frames detection service 40 may determine the present frame is a duplicate of the adjacent frame. If the hamming distance is not within a threshold, then the duplicate frames detection service 40 may determine the present frame is not a duplicate of the adjacent frame. In some embodiments, the threshold may be 6 bits. In other embodiments, the threshold may be configurable. In additional embodiments, the duplicate frames detection service 40 may maintain a database or a list of results indicating whether each frame is duplicate of an adjacent frame.

Comparing a first hash indicative of a present frame and a second hash indicative of a previous frame may involve comparing each value in the first hash (e.g., brightness of each pixel in a present frame) to each value in the second hash (e.g., brightness of each corresponding pixel in the previous frame). If values in the first hash correlate with corresponding values in the second hash (e.g., the brightness of pixels from the present frame correlates with the brightness of corresponding pixels in the previous frame), the duplicate frames detection service 40 may determine the present frame to be a duplicate of the previous frame and assign a binary value of 1 to the present frame. On the other hand, if the values in the first hash do not correlate with corresponding values in the second hash, the duplicate frames detection service 40 may determine the present frame is not a duplicate of the previous frame and assign a binary value of 0 to the present frame. The duplicate frames detection service 40 may push such results in binary format a results array.

Block 285 of the system 280 may correspond to the process 230 of FIG. 4. After identifying which extracted frames are duplicates based on the array of block 284, the duplicate frames detection service 40 may calculate the frame distance between duplicate frames and average the frame distance among multiple duplicate frames. The duplicate frames detection service 40 may determine whether the average frame distance meets a threshold range. In some embodiments, the threshold range may be between 4 and 7 frames, inclusive. If the average frame distance is within the threshold range, then the duplicate frames detection service 40 may determine the duplicate frames were generated without intent. If the average frame distance is not within the threshold range, then the duplicate frames detection service 40 may determine the duplicate frames with intent. For example, if the average frame distance is equal to 1 frame, then the duplicate frames detection service 40 may determine that the duplicate frames were created with intent.

With the preceding in mind, FIG. 7 is an example schematic 300 depicting a duplicates array using a hashing algorithm, in accordance with an embodiment of the present disclosure. By way of example, the duplicate frames detection service 40 may extract 4 frames from a content that has a duration of 1 second. In this example, the duplicate frames detection service 40 has determined that frames 1 and 4 are duplicates based on comparing frames 1 and 4 with adjacent frames and computing the hamming distance as described in FIG. 4. Each hash output may be represented by any suitable numbering system such as a binary format, a base 10 format, a hexadecimal format, and so forth. FIG. 7 illustrates an exemplary embodiment where each hash is represented in a binary format, made up of a length of 256 bits. For simplicity only the last 6 bits of each hash are depicted in FIG. 7. For illustration purposes, the present discussion will assume that the first portion for the current hash and the previous hash that is not displayed for each frame are the same. However, in actual embodiments, the leading bits may oftentimes vary.

Respective bits of each hash may be compared to determine the hamming distance. If the hamming distance is within a pre-defined threshold (e.g., in some embodiments, is less than 6 bits), the duplicate frames detection service 40 may determine the current hash is a duplicate of the previous hash. As indicated by 302, with respect to current frame 1, the last six bits of the current hash (e.g., "000001") and the last six bits of the previous hash (e.g., "100001") merely differ by the first bit of the last six bits of the current hash (e.g., "0") and the previous hash (e.g., "1"). Thus, there is only 1 differing bit between the current hash and the previous hash, resulting in a hamming distance of 1. Because the hamming distance is 1, which is less than the hamming distance threshold (e.g., in the current embodiment, 6), the duplicate frames detection service 40 may determine the current frame is a duplicate of the previous frame.

On the other hand, as indicated by 304, with respect to current frame 2, each of the last 6 bits of the current hash (e.g., "011110") and the previous hash (e.g., "100001") differ. Because the number of bits differing between the current hash and the previous hash is 6, and the hamming distance is not less than the threshold (e.g., 6), the duplicate frames detection service 40 may determine the current frame is not a duplicate of the previous frame. Similar to current frame 1, current frame 4 has been indicated as a duplicate frame, as there are only two bits of difference, resulting in a hamming distance that is less than the threshold indicating non-duplicate frames. That is, current frame 4 may be a duplicate of current frame 3. Similar to current frame 2, current frame 3 has not been indicated as a duplicate frame, as there are 6 bits of difference, resulting in a hamming distance that is greater than/equal to the threshold indicating non-duplicate frames. That is, current frame 3 may not be a duplicate of current frame 2. In some embodiments, the duplicate frames detection service 40 may output a total number of duplicates frames detected 306 and/or a duplicates array 308 that indicates particular positions of identified duplicate frames within a set of frames, via a display. A total of 2 duplicates detected are displayed in this example. Further, the duplicates array 308 includes a binary value of 1 in the second position and the fifth position of the array indicating the duplicates at current frame 1 and current frame 4. The first position in the duplicates array may represent current frame 0.

FIG. 8 is another example schematic 350 generating an output related to duplicate frame detection. As mentioned above, each hash may be represented by any suitable numbering system such as a binary format, a base 10 format, a hexadecimal format, and so forth. Similar to FIG. 7, in the illustrated embodiment, each hash is represented by in a binary format having a length of 256 bits. However, for simplicity only the last 6 bits of each hash are depicted in FIG. 8. For discussion purposes, it may be assumed that the first portion for the current hash and the previous hash that is not displayed for each frame are the same. However, in actual embodiments, any of the leading bits may differ.

Respective bits of each hash may be compared to determine the hamming distance. If the hamming distance is less than 6 bits or within the threshold, the duplicate frames detection service 40 may determine the current hash is a duplicate of the previous hash. By way of example, the duplicate frames detection service 40 may extract 17 frames from a content that has a duration of 1 second. In this example, the duplicate frames detection service 40 has determined that current frames 1, 5, 9, 13, and 17 are duplicates based on comparing the current frames with the adjacent frames and computing the hamming distance as described in FIG. 4. Although not shown in FIG. 8, the other extracted frames are not duplicates. As a result, the total duplicates detected 352 is displayed as 5. Furthermore, the duplicates array 354 includes a binary value of 1 in the second, sixth, tenth, fourteenth, and eighteenth positions indicating the duplicates at current frames 1, 5, 9, 13, 17. Because the duplicate frames detection service 40 has identified a pattern between duplicate frames, the duplicate frames may have been created without intent. That is, starting from frame 1, every fourth frame of the total 17 frames is a duplicate as indicated by the average duplication frame rate 356. In this example, if the average frame distance is within the threshold range (between 4 to 7 frames), then the duplicate frames detection service 40 may determine that patterns are present between duplicate frames. As such, the presence of patterns may be indicative of the duplicate frames without intent. Because duplicate frames without intent have been identified, the duplicate frames detection service may output an indication of "duplicate frame issue detected" as indicated by 358. For purposes of illustration, FIGS. 7 and 8 both display the output of the hash in binary format but the output of the hash may also be in other numerical formats such as decimal or hexadecimal. Regardless of the format, the operations to calculate the hamming distance may continue to be bitwise where the comparison is still performed bit-by-bit in binary form.

With the foregoing in mind, FIG. 9 illustrates example elements that may be part of the duplicate frames detection service 40, in accordance with embodiments presented herein. For example, the duplicate frames detection service 40 may include a communication component 402, a processor 404, a memory 406, a storage 408, input/output (I/O) module 410, a display 412, and the like. The communication component 402 may be a wireless or wired communication component that may facilitate communication between the duplicate frames detection service 40 and other electronic devices.

The memory 406 and the storage 408 may be any suitable articles of manufacture that can serve as media to store processor-executable code, data, or the like. These articles of manufacture may represent computer-readable media (i.e., any suitable form of memory or storage) that may store the processor-executable code used by the processor 404 to perform the presently disclosed techniques. In some embodiments, the memory 406 may include a volatile data storage unit, such as a random-access memory (RAM) and the storage 408 may include a non-volatile data storage unit, such as a hard disk. The memory 406 and the storage 408 may also be used to store the data, analysis of the data, and the like. The memory 406 and the storage 408 may represent non-transitory computer-readable media (i.e., any suitable form of memory or storage) that may store the processor-executable code used by the processor 404 to perform various techniques described herein. It should be noted that non-transitory merely indicates that the media is tangible and not a signal. The processor 404 may include any suitable number of processors 404 (e.g., one or more microprocessors) that may execute software programs to determine the presence of duplicate frames provide alerts or notification to a user in response to detecting duplicate frames. The processors 404 may process instructions for execution within the duplicate frames detection service 40. The processor 404 may include single-threaded processor(s), multi-threaded processor(s), or both. The processor 404 may process instructions and/or information (e.g., control software, look up tables, configuration data) stored in memory device(s) 406 or on storage device(s) 408. The processor 404 may include hardware-based processor(s) each including one or more cores. Moreover, the processor 404 may include multiple microprocessors, one or more "general-purpose" microprocessors, one or more system-on-chip (SoC) devices, one or more special-purpose microprocessors, one or more application specific integrated circuits (ASICS), and/or one or more reduced instruction set (RISC) processors. The processor 404 may be communicatively coupled to the other electronic devices. Further, the processor 404 to may be a part of the duplicate frames detection service 40 and runs software to determine patterns between adjacent frames, compute the hamming distance, identify duplicate frames, and calculate average frame distance between duplicate frames.

One or more memory devices (collectively referred to as the "memory device 406") may include a tangible, non-transitory, machine-readable medium, such as a volatile memory (e.g., a random access memory (RAM)) and/or a nonvolatile memory (e.g., a read-only memory (ROM), flash memory, a hard drive, and/or any other suitable optical, magnetic, or solid-state storage medium). The memory device 406 may store a variety of information that may be used for various purposes. For example, the memory device 406 may store machine-readable and/or processor-executable instructions (e.g., firmware or software) for the processor 404 to execute. In particular, the memory device 406 may store instructions that cause the processor 404 to determine forecasting information using the machine learning based forecast model.

The duplicate frames detection service 40 may also include the input/output (I/O) module 410. The I/O module 410 may enable the duplicate frames detection service 40 to communicate with various electronic devices. Input/output (I/O) module 410 may be added or removed from the duplicate frames detection service 40 via expansion slots, bays or other suitable mechanisms. In certain embodiments, the I/O modules 410 may be included to add functionality to the duplicate frames detection service 40, or to accommodate additional process features. For instance, the I/O module 410 may communicate with other electronic devices (e.g., content providers 12) to analyze duplicate frames. It should be noted that the I/O modules 410 may communicate directly to other electronic devices or user input devices through hardwired connections or may communicate through wired or wireless networks, such as Hart or IOLink.

Generally, the I/O modules 410 serve as an electrical interface to the duplicate frames detection service 40 and may be located proximate or remote from duplicate frames detection service 40, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, Ethernet/IP, and so forth), ControlNet, DeviceNet or other network protocols (Foundation Fieldbus (H1 and Fast Ethernet) Modbus TCP, Profibus) and also communicate to higher level computing systems. Several of the I/O modules 410 may transfer input and output signals between the duplicate frames detection service 40.

The duplicate frames detection service 40 may be equipped with the display 412. The display 412 may provide a user or content providers 12 with information about the data received via the communication component 402. The information may include data received from the duplicate frames detection service 40 and may indicate number of duplicate frames, average distance between duplicate frames, any issues due to duplicate frames, and so forth.

The duplicate frames detection service 40 may be implemented as a single computing system or multiple computing systems. The computing systems associated with the duplicate frames detection service 40 may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe the duplicate frames detection service 40 as a physical device, implementations are not so limited. In some examples, the duplicate frames detection service 40 may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method for detecting unintended duplicate frames in content, comprising:
   identifying, via one or more processors, one or more duplicate frames within the content;
   calculating, via the one or more processors, an average frame distance between the one or more duplicate frames;
   determining, via the one or more processors, whether the one or more duplicate frames are generated without intent based on the average frame distance between the one or more duplicate frames; and
   providing, via the one or more processors, an indication of whether the one or more duplicate frames are generated without intent to a client device.

2. The method of claim 1, wherein identifying, via the one or more processors, the one or more duplicate frames within the content comprises:
   receiving, via the one or more processors, the content;

extracting, via the one or more processors, one or more frames from the content;

determining, via the one or more processors, a hamming distance between each of the one or more frames and corresponding one or more adjacent frames; and identifying, via the one or more processors, the one or more duplicate frames in response to determining that the hamming distance is less than a threshold hamming distance.

3. The method of claim 2, further comprising generating, via the one or more processors, a binary array indicative of each of the one or more frames as duplicate or not duplicate based on the threshold hamming distance.

4. The method of claim 2, wherein the threshold hamming distance comprises 6 bits.

5. The method of claim 1, wherein the indication provided to the client device indicates that the one or more duplicate frames are generated without intent in response to determining, via the one or more processors, the average frame distance between the one or more duplicate frames meets a threshold frame distance.

6. The method of claim 1, wherein the indication provided to the client device indicates that the one or more duplicate frames are generated with intent in response to determining, via the one or more processors, that the average frame distance between the one or more duplicate frames does not meet a threshold frame distance.

7. The method of claim 6, wherein the threshold frame distance comprises between 4 and 7 frames.

8. The method of claim 1, further comprising identifying, via the one or more processors, a frequency of the one or more duplicate frames in the content, one or more patterns associated with the one or more duplicate frames, or both.

9. A non-transitory, machine-readable medium, comprising machine-readable instructions that, when executed by one or more processors of a machine, cause the machine to:
    identify one or more duplicate frames in content;
    calculate an average frame distance between the one or more duplicate frames;
    identify a frequency of the one or more duplicate frames in the content, one or more patterns associated with the one or more duplicate frames, or both; and
    determine whether the one or more duplicate frames are generated with intent based on the average frame distance between the one or more duplicate frames.

10. The non-transitory, machine-readable medium of claim 9, wherein the machine-readable instructions cause the machine to identify the one or more duplicate frames in the content based at least in part on:
    receiving the content;
    extracting one or more frames from the content;
    determining a hamming distance between each of the one or more frames and corresponding one or more adjacent frames; and
    identifying the one or more duplicate frames in response to determining that the hamming distance is less than a threshold hamming distance.

11. The non-transitory, machine-readable medium of claim 10, wherein the machine-readable instructions further cause the machine to generate a binary array indicative of each of the one or more frames as duplicate or not duplicate based on the threshold hamming distance.

12. The non-transitory, machine-readable medium of claim 9, wherein the machine-readable instructions further cause the machine to:
    determine that the average frame distance does not meet a threshold criteria in response to determining that the average frame distance comprises 1 frame; and
    determine that the one or more duplicated frames are generated with intent in response to determining that the average frame distance does not meet the threshold criteria.

13. The non-transitory, machine-readable medium of claim 12, wherein the machine-readable instructions further cause the machine to provide a notification indicative of intentional duplicate frames to a client device based on determining that the average frame distance does not meet the threshold criteria.

14. The non-transitory, machine-readable medium of claim 9, wherein the machine-readable instructions further cause the machine to:
    determine that the average frame distance meets a threshold criteria in response to determining that the average frame distance comprises between 4 and 7 frames; and
    determine that the one or more duplicated frames are generated without intent in response to determining that the average frame distance meets the threshold criteria.

15. The non-transitory, machine-readable medium of claim 14, wherein the machine-readable instructions further cause the machine to provide a notification indicative of unintentional duplicate frames to a client device based on determining that the average frame distance meets the threshold criteria.

16. A duplicate frames detection system, comprising:
    one or more processors; and
    one or more memory devices configured to store instructions that, when executed by the one or more processors, cause the one or more processors to:
        identify one or more duplicate frames;
        calculate an average frame distance between the one or more duplicate frames; and
        determine whether the one or more duplicate frames are generated without intent based on the average frame distance between the one or more duplicate frames.

17. The duplicate frames detection system of claim 16, wherein the instructions, when executed by the one or more processors, further cause the one or more processors to provide an indication of whether the one or more duplicate frames are generated with intent to a client device.

18. The duplicate frames detection system of claim 16, wherein the instructions, when executed by the one or more processors, further cause the one or more processors to determine that the one or more duplicate frames are generated without intent in response to determining the average frame distance between the one or more duplicate frames meets a threshold criteria.

19. The duplicate frames detection system of claim 16, wherein the instructions, when executed by the one or more processors, cause the one or more processors to identify the one or more duplicate frames based at least in part on:
    extracting one or more frames from content;
    determining a hamming distance between each of the one or more frames and corresponding one or more adjacent frames; and
    identifying the one or more duplicate frames in response to determining that the hamming distance is less than a threshold hamming distance.

* * * * *